(12) United States Patent
Dooley et al.

(10) Patent No.: US 11,881,087 B2
(45) Date of Patent: Jan. 23, 2024

(54) FUND DISBURSEMENT AT AN AUTOMATED TELLER MACHINE (ATM) USING A CREDIT PUSH

(71) Applicant: ITS, INC., Johnston, IA (US)

(72) Inventors: Terry Dean Dooley, West Des Moines, IA (US); Manish S Nathwani, Grimes, IA (US); Scott Robert Green, West Des Moines, IA (US); Stephan Dwayne Thomasee, Johnston, IA (US)

(73) Assignee: ITS, Inc., Johnston, IA (US)

( * ) Notice: Subject to any disclaimer, the term of this patent is extended or adjusted under 35 U.S.C. 154(b) by 16 days.

(21) Appl. No.: 17/669,176

(22) Filed: Feb. 10, 2022

(65) Prior Publication Data

US 2023/0252862 A1 Aug. 10, 2023

(51) Int. Cl.
*G07F 19/00* (2006.01)
*G07F 7/12* (2006.01)

(52) U.S. Cl.
CPC .......... *G07F 19/203* (2013.01); *G07F 7/122* (2013.01); *G07F 19/209* (2013.01); *G07F 19/211* (2013.01)

(58) Field of Classification Search
None
See application file for complete search history.

(56) References Cited

U.S. PATENT DOCUMENTS

| | | |
|---|---|---|
| 7,216,800 B1 | 5/2007 | Ramachandran |
| 8,632,000 B2 | 1/2014 | Laracey |
| 9,922,370 B2 | 3/2018 | Kobres et al. |
| 10,275,827 B2 | 4/2019 | McCarthy et al. |
| 10,719,814 B1 * | 7/2020 | Meiroff ............... G06Q 20/1085 |
| 11,182,776 B1 * | 11/2021 | Bhos ..................... G06Q 20/381 |

(Continued)

FOREIGN PATENT DOCUMENTS

| | | |
|---|---|---|
| CN | 104599408 B | 8/2017 |
| IN | 1992MU2013 A | 5/2015 |

(Continued)

OTHER PUBLICATIONS

"Payment Systems in Japan, Japanese Bankers Association, May 2012, 12-16" (Year: 2012).*

(Continued)

*Primary Examiner* — Kito R Robinson
*Assistant Examiner* — Toan Duc Bui
(74) *Attorney, Agent, or Firm* — SHOOK, HARDY & BACON L.L.P.

(57) ABSTRACT

A payment processing method uses a credit push for disbursing funds at ATM. The process can include scanning an optical code at an ATM using a mobile device to determine creditor bank information. A debtor bank server receives a funds disbursement request and provides a credit push request to a payment rail. The payment rail communicates a credit payment transaction request to a creditor bank sever. The creditor bank server identifies the ATM using an ATM identifier provided to the mobile device via the optical code. The ATM is instructed to disburse funds by the creditor bank server. The method includes using the mobile device, or other issuer domain, authentication procedures. The funds can be disbursed by the ATM without the ATM performing any authentication procedures.

13 Claims, 6 Drawing Sheets

(56) References Cited

U.S. PATENT DOCUMENTS

| | | | |
|---|---|---|---|
| 2004/0039691 A1* | 2/2004 | Barratt | G06Q 20/04 |
| | | | 705/41 |
| 2009/0307141 A1* | 12/2009 | Kongalath | G06Q 20/403 |
| | | | 235/382 |
| 2011/0042403 A1* | 2/2011 | Martin | B65H 5/04 |
| | | | 221/124 |
| 2011/0178903 A1* | 7/2011 | Adams | G07F 7/1008 |
| | | | 235/382.5 |
| 2013/0124411 A1* | 5/2013 | Kobres | G06Q 40/02 |
| | | | 235/379 |
| 2016/0034104 A1* | 2/2016 | Lee | H01L 27/1218 |
| | | | 345/173 |
| 2018/0018669 A1* | 1/2018 | Goldberg | G06Q 20/405 |
| 2018/0225639 A1* | 8/2018 | Rosamilia | G06Q 20/02 |
| 2018/0285843 A1 | 10/2018 | Chaturvedi | |
| 2020/0065787 A1* | 2/2020 | Kruczek | G06Q 20/40145 |
| 2020/0247633 A1* | 8/2020 | Hoffman | B65H 15/016 |
| 2021/0133710 A1* | 5/2021 | Kohli | H04L 9/50 |
| 2021/0150497 A1* | 5/2021 | Phillips | G06Q 20/3276 |
| 2022/0292496 A1* | 9/2022 | Yan | G06Q 40/04 |

FOREIGN PATENT DOCUMENTS

| | | |
|---|---|---|
| JP | 6673585 B2 | 3/2020 |
| WO | WO2014090094 A1 | 6/2014 |

OTHER PUBLICATIONS

"Push payments: the untapped opportunity in Australia," Visa, <https://www.visa.com.au/content/dam/VCOM/regional/ap/australia/global-elements/Documents/research-and-trends-visa-push-payments-report-2015.pdf>, 42 pages.

"Cross-Bank Cardless Withdrawal," Jetco, <https://www.jetco.com.hk/en/atm/cardless-withdrawal>, 5 pages.

* cited by examiner

FUND DISBURSEMENT AT AN AUTOMATED TELLER MACHINE (ATM) USING A CREDIT PUSH

BACKGROUND

Automated teller machines (ATMs) are commonplace. ATMs are terminals that generally allow cash withdrawal. Many ATMs today are associated with financial institutions. ATMs usually have the capability to facilitate different types of transactions with different institutions. ATMs generally provide a verification process, such as scanning or reading a card-based payment device and permitting entry of personal identification numbers (PIN) to authenticate the transaction by the payment card.

SUMMARY

At a high level, aspects described herein relate to systems and methods that facilitate fund distribution at a terminal device, such as an ATM, using a credit push. Generally, a credit push transaction process is an account-based transaction. This can absolve the need to use the ATM to perform authentication, while using more secure authentication methods of the mobile device.

To facilitate funds disbursement, an optical code is generated at a terminal device. The optical code embeds creditor bank information that identifies a creditor bank associated with the ATM from which the funds will be received. The optical code can further embed an ATM identifier identifying the ATM from which the funds will be received.

A payment application can be invoked by a mobile device. Using the payment application, an amount of funds to be disbursed by the ATM can be identified from the user. The mobile device captures the optical code using a camera and decodes the creditor bank information. Using this information, the application facilitates communication of a payment request including credentials of the ATM owner, and the amount of funds from the mobile device to a debtor bank server associated with a debtor bank.

The debtor bank server communicates a credit push request to a payment rail, where the credit push request comprises the creditor bank information, the amount of funds to be transferred, debtor bank information identifying the debtor bank, and the ATM identifier. The debtor bank has funds on deposit that the payment rail may use for settlement, and the payment rail generally maintains a payment rail account ledger for both the creditor bank and the debtor bank. The payment rail uses the creditor bank information to identify a messaging protocol for routing a credit payment transaction request to a creditor bank server.

The creditor bank server receives the credit payment transaction request, which comprises the amount of funds to be transferred and the ATM identifier. The creditor bank server communicates instructions to the ATM using the ATM identifier to disburse the amount of funds. In response to receiving the instruction, the ATM disburses the funds. The ATM confirms to the creditor bank server that the funds were disbursed.

The creditor bank server sends a confirmation status that the funds have been disbursed back to the payment rail. In response, the payment rail completes the debit to the debtor bank and credit to the creditor bank. The payment rail communicates a real-time settlement notification to the debtor bank indicating a settlement between the creditor bank account and the debtor bank account.

This Summary is intended to introduce a selection of concepts in a simplified form that is further described in the Detailed Description section of this disclosure. It is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
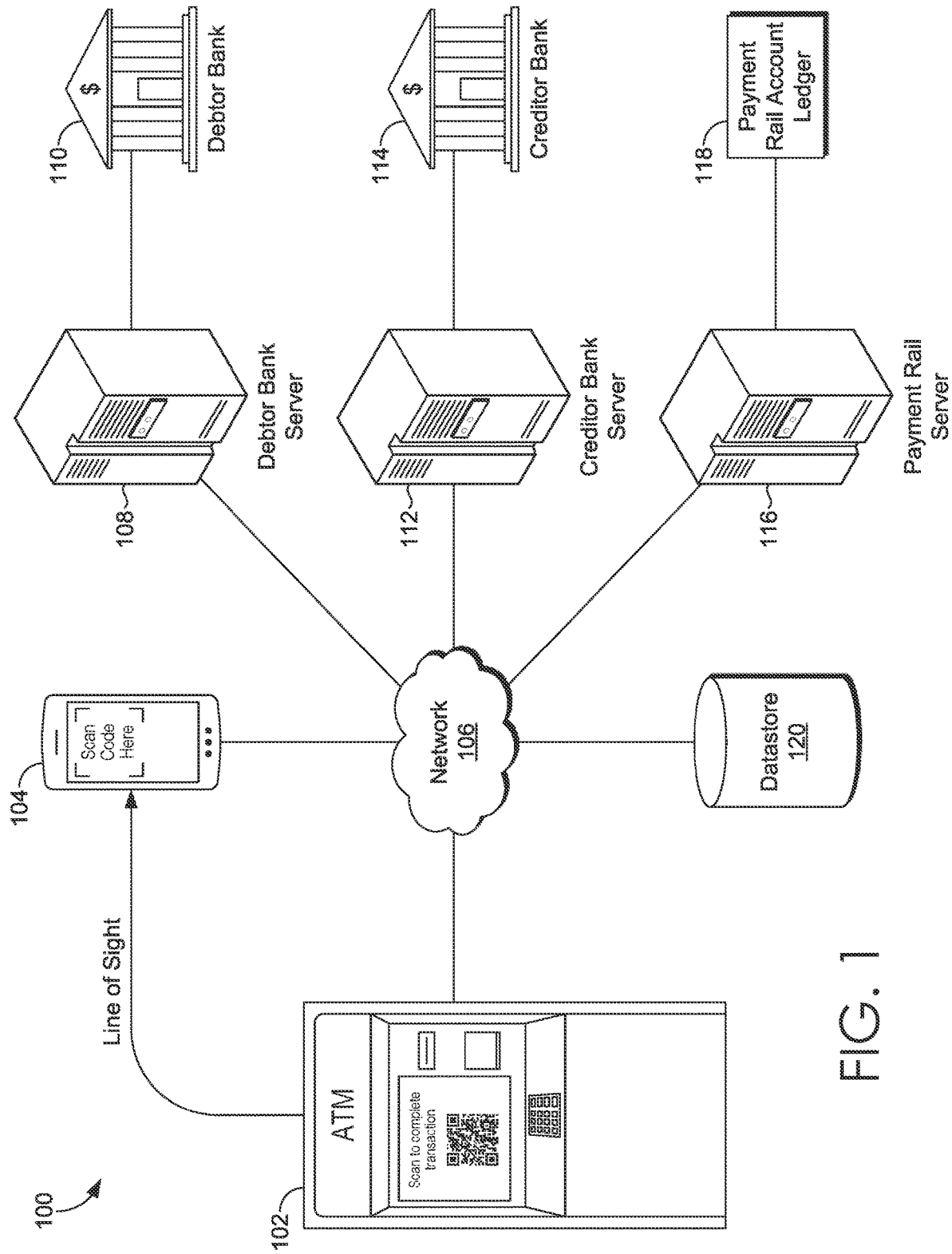
FIG. 1 is an example operating environment in which aspects of the present technology can be employed to disburse funds using a credit push, in accordance with an aspect described herein.

ATMs are terminal devices commonly used to withdraw funds from an account. In general, these ATMs accept a card-based payment device and perform an authentication procedure, such as accepting a PIN that is associated with the card-based payment device. This is commonly how a debit card works. In most cases, these transactions are settled using a debit pull transaction process, which generally does not have a real-time settlement procedure.

The present disclosure provides for methods of using ATMs for fund withdrawal using a credit push. This provides an account-based processing method for disbursing funds. By using some of the processes described herein, the need for the ATM to perform the authentication steps is eliminated, and instead, an authentication process can be performed by other systems, such as a mobile device.

By performing the authentication procedure using a system other than an ATM, better, more secure, authentication procedures can be performed. For instance, many mobile devices have the capability to perform biometric authentication procedures, such as those that use fingerprint or facial identification. Further, mobile devices can accept and process passcodes that are more secure than a traditional 4-digit PIN associated with a payment card.

Moreover, ATMs traditionally accept only debit cards, since the authentication procedure relies on accepting a PIN number that can be crossed referenced with a stored PIN on the card or at the issuer. However, this inherently requires storage of the PIN, making it susceptible to data breaches. PINs can also be susceptible to eavesdropping when used at an ATM. Debit cards traditionally lack the capability to provide ATMs with more enhanced security features, such as biometric capabilities, since the ATM would have to access and confirm a biometric scan with data stored on the debit card itself or at the issuer. Given the limited security features provided by some traditional ATMs, other payment devices, such as credit cards, may not be usable at the ATM to withdraw funds or perform other financial transactions.

To address these issues, some ATMs have been outfitted with near-field communication (NFC) systems. These systems allow the ATM to communicate using NFC frequencies to nearby devices, and provide a more secure data transfer method when disbursing funds. However, many existing ATMs do not have this equipment. It is challenging, and sometimes impossible, to outfit some existing ATMs with the hardware necessary to perform these operations. Further, while NFC systems provide additional security and better communication on the front end between devices, NFC systems do not address the issue of relying on debit pull transaction processes to facilitate the transaction and disburse funds.

The present disclosure provides for methods that can use an optical-based system in combination with a credit push processing scheme to disburse funds. The systems and methods described provide advantages to the existing ATM technology.

For instance, nearly all ATMs have a display device. The display device can be used to present an optical code that can be read by a mobile device having a camera. This alleviates the need to modify the ATM device with NFC hardware. By using an optical code, information can be transmitted from the ATM to the mobile device, and the mobile device can then begin the process of facilitating the fund disbursement. This is different from traditional methods that use the ATM to facilitate fund disbursements by receiving information from the user and transmitting communicating the information to a creditor bank associated with the ATM.

By providing information to the mobile device about the ATM and its associated creditor bank, the mobile device can then be used to perform the authentication procedure using more advanced and secure technologies. Thus, the ATM may not authenticate the user at all during the fund disbursement process.

The change from using the ATM to initiate a disbursement request to using a mobile device to initiate the disbursement request helps to facilitate a transaction process that uses a credit push between the debtor bank and the creditor bank. By doing so, the transaction process flows from the debtor bank, through a payment rail that maintains a payment rail account ledger, to the creditor bank associated with the ATM. By using this credit push transaction process, the payment rail facilitates a real-time settlement between a debtor bank account and a creditor bank account. This deviates from the traditional card-based, debit pull methods by performing a real-time settlement during the course of the fund disbursement.

Technologically, these methods reduce the number of hardware components that have to be equipped at an ATM, since the communication can occur using a display device to provide the optical code. These methods are more secure because the optical code cannot be intercepted, unlike some NFC communication protocols, without a direct line of sight. Even if intercepted, the information embedded within the optical code still would not provide enough information to facilitate a malicious transaction without access to the mobile device, since the mobile device facilitates the transaction via the payment application that identifies the debtor bank server for which to start the transaction.

Moreover, these methods also reduce some of the cryptographic exchanges that occur using traditional methods, where authentication information, such as a PIN, is provided to the ATM and the ATM must employ various cryptographic methods to match the PIN stored with the issuer. In doing so, fewer read-write operations used for the encryption are performed by the ATM processor, as compared to some aspects of the presently disclosed technology. This reduces demand on the ATM processor, allowing smaller processers to be used. In all, due to the reduced communication hardware and the reduced processing demand, ATMs employing methods described herein can be smaller and be placed in a wider range of locations, yet still provide higher standards of authentication procedures, leading to security that is more robust.

In addition to benefits at the ATM, there are also benefits to creditor bank servers and debtor bank servers that result from the credit push transaction processes. As noted, some of the aspects process the transaction between the creditor bank and the debtor bank through a payment rail. As part of this, the transaction between the creditor bank and the debtor bank is settled as the transaction unfolds. That is, the transaction will generally be settled at or prior to disbursement of the funds.

This deviates from many of the debit pull methods, as some of these methods settle accounts after the transaction is conducted. This not only leaves unnecessary holds on accounts, but also causes settlement messages to be sent after fund disbursement. In many cases, settling the accounts as can delayed, since these post-disbursement messages can be held in a processing queue at the creditor bank server or the debtor bank server. This queue backlog can, and often does, generate error messages. These error messages are ultimately provided to an ATM, where the ATM stops disbursing funds, or disburses funds more slowly, until the servers can process the message backlog. Many of these issues are reduced or eliminated using the credit push transaction processes described herein, since the processes provide for real-time account settlement through the payment rail.

Accordingly, one example process that can achieve some of the previously described benefits over conventional methods includes a fund disbursement at an ATM using a credit push transaction method.

To begin, a user invokes a payment application at a mobile device. The payment application allows the user to "pre-stage" a transaction, such as a fund withdrawal at an ATM, by indicating how much the user wants to withdraw from the ATM by entering the amount at the mobile device via the application.

At an ATM, the user may select a fund withdrawal and indicate that it wishes to use the pre-staged transaction of the payment application. The ATM generates and displays an optical code at a display device, and the optical code comprises creditor bank information. Creditor bank information may comprise an ATM identifier that identifies the ATM, a routing number for a creditor bank, and an account number associated with a creditor account, among other like information, embedded within it. Further ATM identifier may identify a unique instance in which the ATM generates an optical code. The mobile device captures an image of the optical code using a camera, and the embedded information is decoded. Additional discussion related to prestaging transactions and initiating fund withdrawals at an ATM using optical codes is included in U.S. application Ser. No. 16/988,456, filed on Aug. 7, 2020, entitled "Interoperable Mobile-Initiated Transactions with Dynamic Authentication," which is expressly incorporated herein by reference in its entirety. Another benefit provided by these methods is that the system can use an application agnostic to the ATM creditor. That is, the application can request fund withdrawal at an ATM associated with different institutions and using different card-based processing technologies, since the institution and ATM information is passed to the mobile device via the optical code and the mobile device initiates the transaction, as opposed to traditional methods where the ATM initiates the process by communicating information directly to is associated creditor bank server.

To ensure security, the payment application may initiate an authorization procedure that uses mobile device hardware to authenticate a user. Some common authentication procedures include facial identification and fingerprint identification, although it will be realized that other forms of security can be employed. Moreover, the payment application may provide user-entered information to another entity, such as the debtor bank, for authentication, in addition to or in lieu of mobile device authentication methods.

After authenticating the user, the mobile device sends a fund disbursement request to a debtor bank server. The debtor bank server is associated with the debtor bank where the user, now termed the debtor in the transaction, has a debtor account. Here, the debtor bank server can place a debit hold for the amount of funds requested to be disbursed on the debtor account. This can be a temporary hold that is completed after the transaction is finalized, which will be discussed further.

The debtor bank server, on behalf of the debtor bank, sends a credit push request to a payment rail server of a payment rail. In general, the payment rail maintains a payment rail account ledger for deposits by participating institutions pledged for transaction settlement. One example payment rail includes FedNow$^{SM}$ Service, which will be offered to depository institutions by the Federal Reserve. Another example includes Real-Time Payments (RTP®) provided by The Clearing House, which is also available for U.S. depository institutions. It will also be understood that other like payment rail systems can be used, and that one or more payment rail system can be included as part of the credit push payment process based on institution affiliation.

The payment rail, upon receiving the credit push request at the payment rail server, can place a debit hold on the funds of the debtor bank for the amount of the transaction. Further, the payment rail can identify the communication protocol for sending messages to the creditor bank using the creditor information provided with the credit push request.

The payment rail server then sends a credit payment transaction request to the creditor bank server using the communication protocol, which may include a uniform resource identifier (URI) for the creditor bank server or another communication protocol method, which has been identified by the payment rail. The credit payment transaction request can comprise the ATM identifier and the amount of funds to be disbursed.

When the creditor bank server receives the credit payment transaction request from the payment rail, the creditor bank server sends disbursement instructions to the ATM based on the ATM identifier. The creditor bank may place a temporary credit to the ATM owner's account.

In response to the instruction, the ATM disburses the funds to the user. The ATM may then send a disbursement confirmation back to the creditor bank server indicating that the amount of funds has been disbursed and equals the amount of funds indicated by the disbursement instructions.

Based on the disbursement confirmation by the ATM, the creditor bank server completes the credit to the ATM owner's account. The creditor bank server sends a confirmation status to the payment rail server. The confirmation status indicates that the amount of funds has been disbursed to the user.

Having now completed the transaction by the funds being disbursed, the payment rail effects settlement by making debit entry on the payment rail account ledger to debit the debtor bank account and credit the creditor bank account in accordance with the amount of the disbursement.

The payment rail server sends a real-time settlement notification to the debtor bank server. In response, the debtor bank server can complete the debit of the debtor account, release the debit hold, and send a settlement notification to the mobile device via the payment application. In this way, the transaction is fully processed using a credit push method. By doing so, the transaction is settled between the debtor bank and the creditor bank during the process of the transaction through the payment rail, providing some of the benefits previously discussed.

It will be realized that the method previously described is only an example that can be practiced from the description that follows, and it is provided to more easily understand the technology and recognize its benefits. Additional examples are now described with reference to the figures.

With reference now to FIG. 1, FIG. 1 is an example operating environment 100 in which aspects of the present technology can be employed to disburse funds using a credit push transaction process. As illustrated, operating environment 100 comprises ATM 102 and mobile device 104, which can communicate to other components of FIG. 1 through network 106. As further illustrated, ATM 102 and mobile device 104 can also communicate using other line-of-sight communication methods that will be described in more detail.

Network 104 may include one or more networks (e.g., public network or virtual private network "VPN") as shown with network 104. Network 104 may include, without limitation, one or more local area networks (LANs) wide area networks (WANs), or any other communication network or method. In implementations, components of FIG. 1 can communicate via network 106 using ISO (International Organization for Standardization) 20022 messaging protocols. Such standards include those provided by the ISO, prepared by TC (Technical Committee) 68, published 2013-05 as ISO 20023:2013-Financial services, Universal financial industry message scheme, Parts 1-7, which are hereby expressly incorporated by reference in their entirety.

Operating environment 100 also comprises debtor bank server 108 associated with debtor bank 110, creditor bank server 112 associated with creditor bank 114, and payment rail server 116 associated with a payment rail that maintains payment rail account ledger 118. Each of the components may communicate directly or indirectly with other components of FIG. 1 through network 106.

Operating environment 100 further comprises datastore 120. Datastore 120 generally stores information including data, computer instructions (e.g., software program instructions, routines, or services), or models used in embodiments of the described technologies. Although depicted as a single database component, data store 120 may be embodied as one or more data stores or may be in the cloud. One example suitable for use as datastore 120 is memory 612 discussed with reference to FIG. 6.

Having identified various components of operating environment 100, it is emphasized that any additional or fewer components, in any arrangement, may be employed to achieve the desired functionality and are within the scope of the present disclosure. For instance, some embodiments of the technology comprise a TxP (transaction processing) server communicating with debtor bank server 108 to facilitate sending and receiving communications. The TxP server, if present in an embodiment, may be associated with the debtor bank 110 or a third-party entity. Similarly, some embodiments comprise an acquiring switch communicating with creditor bank server 112 to facilitate sending and receiving communications. Each of the TxP server and the acquiring switch can comprise a server executing software for identifying and routing communications messages to aid in overall network communication. This may include identifying specific terminal devices, including ATMs, and routing messages from a creditor bank server to an intended terminal device. This may also comprise identifying communication traffic from a mobile device and routing the communication traffic to an intended depository institution, such as debtor bank 110.

Although the various components of FIG. 1 are shown with lines for the sake of clarity, the lines can illustrate a direct path of communication from one component to another, or may represent a path in which other intermediary components are present, such as the TxP server, acquiring switch, or any other component.

While components of FIG. 1 are depicted as single components, the depictions are intended as examples in nature and in number and are not to be construed as limiting for all implementations of the present disclosure. Other arrangements and elements (e.g., machines, interfaces, functions, orders, and groupings of functions, etc.) can be used in addition to or instead of those shown, and some elements may be omitted altogether. As non-limiting examples, while debtor bank server 108, creditor bank server 112, and payment rail server are each illustrated as a single server, it will be understood that each illustrates one or more servers working with one another in any arrangement. As another example, datastore 120 may illustrated one or more datastores provided in any arrangement throughout operating environment 100. This may include one or more datastores specifically associated with, and in communication with, each of debtor server 108, creditor server 113 and payment rail server 116 to provide data and computer-usable instructions to each of their respective components. Therefore, for the sake of brevity and clarity, when components of FIG. 1, or any other figure, are referred to in the singular, this is intended to include functions performed by one or more components working together.

The functionality of operating environment 100 can be further described based on the functionality of the described components. That is, many of the components described in relation to FIG. 1 are entities that perform functions. Various functions described herein are being performed by one or more components and may be carried out by hardware, firmware, or software. That is, functions performed by components of FIG. 1 can be performed by executing computer-executable instructions stored in memory, such as datastore 120.

As previously noted, operating environment 100 comprises ATM 102. ATM 102 is generally a terminal device from which funds can be disbursed. Many ATMs are individual devices communicatively coupled to another depository institution. ATM 102 described here can be associated with creditor bank 114. In this case, creditor bank 114 may own, operate, or otherwise provide instructions to ATM 102 to perform various functions.

ATM 102 can comprise a computer processor in communication with computer-readable media, such as those described with reference to FIG. 6. ATM 102 may comprise a secured chamber from which funds are dispensed. Funds generally include paper currency issued by a governing entity. However, funds may also comprise other types of exchange mediums, such as coupons, tokens, cryptocurrency, and the like. Funds can be disbursed in the form of tangible funds or may be in the form of an electronic mediums deposited onto a payment device, such as a payment card, wallet, mobile device, token, electronic wallet, and the like.

ATM 102 may further comprise a dispensing device. The dispensing device retrieves funds from the secured chamber and moves them to a position outside of, or within, ATM 102 where the funds are accessible and can be retrieved by a user engaging in the transaction. The computer-readable media accessible by the processor of ATM 102 can store one or more drivers configured to operate the dispending device upon receiving an instruction to disburse funds. That is, ATM 102 can receive or provide a disbursement instruction that, through the computer processor, via the driver, operates the dispensing device to disburse funds from the secure chamber in accordance with an amount provided by the instructions.

ATM 102 may further comprise a display device. The display device can provide, for example, a graphical user interface for display at ATM 102. For instance, the display device can display an optical code, where the optical code is visible by the user or within the line of sight of other components of FIG. 1. An optical code can include any indicia that comprises and conveys embedded information to another component, such as mobile device 104. Some examples include machine-readable codes, such one- or two-dimensional barcodes, including but not limited to QR (Quick Response) codes, Aztec codes, Shotcode, PDF417 codes, and so on. ATM 102 may comprise other input/output components in addition to the display device. Examples of some suitable for use are included with reference to the discussion of FIG. 6.

Mobile device 104 is generally a computing device. One example computing device describing components that can be included within mobile device 104 is described with reference to FIG. 6. To provide some non-limiting examples, mobile device 104 can be a smartphone, smartwatch, tablet, and the like. Mobile device 104 is intended to include devices such as connected, wearable headsets, glasses, and the like.

Mobile device 104 comprises a camera as an input component. For instance, the camera may include a lens that focuses light onto a digital sensor that renders a digital image of an area. The camera of the mobile device can be used to capture a digital image of an optical code displayed by the display device of ATM 102 when the camera is positioned within the line of sight of the display device of ATM 102. In this way, information provided at the display device of ATM 102 can be communicated to mobile device 104.

Mobile device 104 can access a payment application. Generally, an application, such as the payment application, is a set of code providing instructions to mobile device 104, which acts in accordance with the instructions. Mobile device 104 may have the payment application stored in local memory, may communicate with a non-local datastore comprising the payment application, or a combination of both.

The payment application may facilitate financial transactions, such as the distribution of funds from ATM 102 using mobile device 104. For instance, a user may invoke the payment application using an input component, e.g., a touch screen, microphone, etc., at mobile device 104.

In some applications of the technology, the payment application allows the user to pre-stage a transaction. When the transaction comprises distributing funds at ATM 102, the user can be prompted, via that application, to enter an amount of funds to be distributed. The amount can be stored in memory accessible to mobile device 104. Other pre-staged information can also be prompted for or provided via that application, such as an indication of a bank, bank account, and so forth.

When invoked, the payment application may initiate the camera of mobile device 104. In some cases, this can include providing instructions at a display device of mobile device 104 to scan an optical code. The camera can be used to capture an optical code in the line of sight of the camera. The payment application can then decode the information embedded within the optical code. For instance, an optical code provided by ATM 102 may include an ATM identifier and creditor bank information. Creditor bank information (e.g., credentials) may include, among other information, a routing number for 114 creditor bank, an account number for a creditor account associated with ATM 102, a card number, or an alias (such as email or phone number used to reference it), or a tokenized representation of the card or account number, such as EMV (Europay, MasterCard, and Visa) payment tokens as tokenized PAN (permanent account number) instead of a PAN. It may also include cryptographically signed data that is used to validate the authenticity of the credential at debtor bank server 108, or another associated server, such as a TxP server. It may be signed by an ATM owner, creditor bank server 112, or payment rail server 116 depending upon implementation. The creditor bank information identifies the creditor bank, while the ATM identifier identifies ATM 102.

Some mobile devices suitable for use as mobile device 104 include security features. These features can work in conjunction with specific hardware associated with the mobile devices. For instance, mobile device 104 can include a fingerprint sensor that receives a fingerprint as an input. The fingerprint is compared to stored fingerprints of authorized users to authenticate the user requesting the fund disbursement. Other security features include facial recognition using the camera. Additional security features, including voice recognition, eye recognition, and so forth are contemplated. The security features can be performed in order to invoke the payment application, may be prompted by the payment application, or a combination of both, to authenticate the user attempting to use the payment application.

In general, a server, such as debtor bank server 108, creditor bank server 112, and payment rail server 116, comprises a processor in communication with computer-readable media. The processor executes instructions on the computer-readable media. As previously discussed, servers illustrated as single servers can be one or more servers working to execute a particular described function.

As illustrated, operating environment 100 comprises debtor bank server 108 that is associated with debtor bank 110, which can be a depository institution offering banking services, such as maintaining financial accounts from which deposits and withdrawals may be made. Debtor bank server 108 can receive communications via network 106 and maintain accounts within debtor bank 110 in accordance with instructions received within the communications. For instance, debtor bank server 108 can identify the available funds in an account to determine whether a transaction can be completed. Debtor bank server 108 can place holds on accounts for an indicated amount of funds, which can include a temporary restriction on withdrawal below the amount of funds until the hold is released. Debtor bank server 108 may further settle accounts, which for instance, can include withdrawing or crediting an account and simultaneously withdrawing or crediting another account for the same amount of funds, or communicating an indication to another institution to withdraw or credit the amount of funds from another account.

It will be understood that creditor bank server 112 may perform actions similar to debtor bank server 112 on behalf of creditor bank 114, and that creditor bank 114 may also be a depository institution. Throughout this disclosure debtor bank server 108, debtor bank 110, creditor bank server 112, and creditor bank 114 are referred to in terms of particular roles performed within the described example transaction. However, it will also be understood that such institutions may perform other roles for different transactions.

As previously described, payment rail server 116 is associated with a payment rail that maintains payment rail account ledger 118. Payment rail account ledger 118 indicates the deposited funds on a debtor bank account of debtor bank 110 and a creditor bank account of creditor bank 114.

Payment rail server 116 on behalf of the payment rail may perform various financial activities using payment rail account ledger 118. For instance, payment rail server 116 can place and release holds, e.g., temporary withdrawal restrictions on a particular amount of funds in an institution's account. Payment rail server 116 may settle accounts by withdrawing an amount of funds from one account or crediting the amount of funds to another account, or similarly, communicating a message to another financial entity to withdraw or credit a particular amount of funds. Other financial activities that may be performed by payment rail server 116 will be understood.

Figure 2:
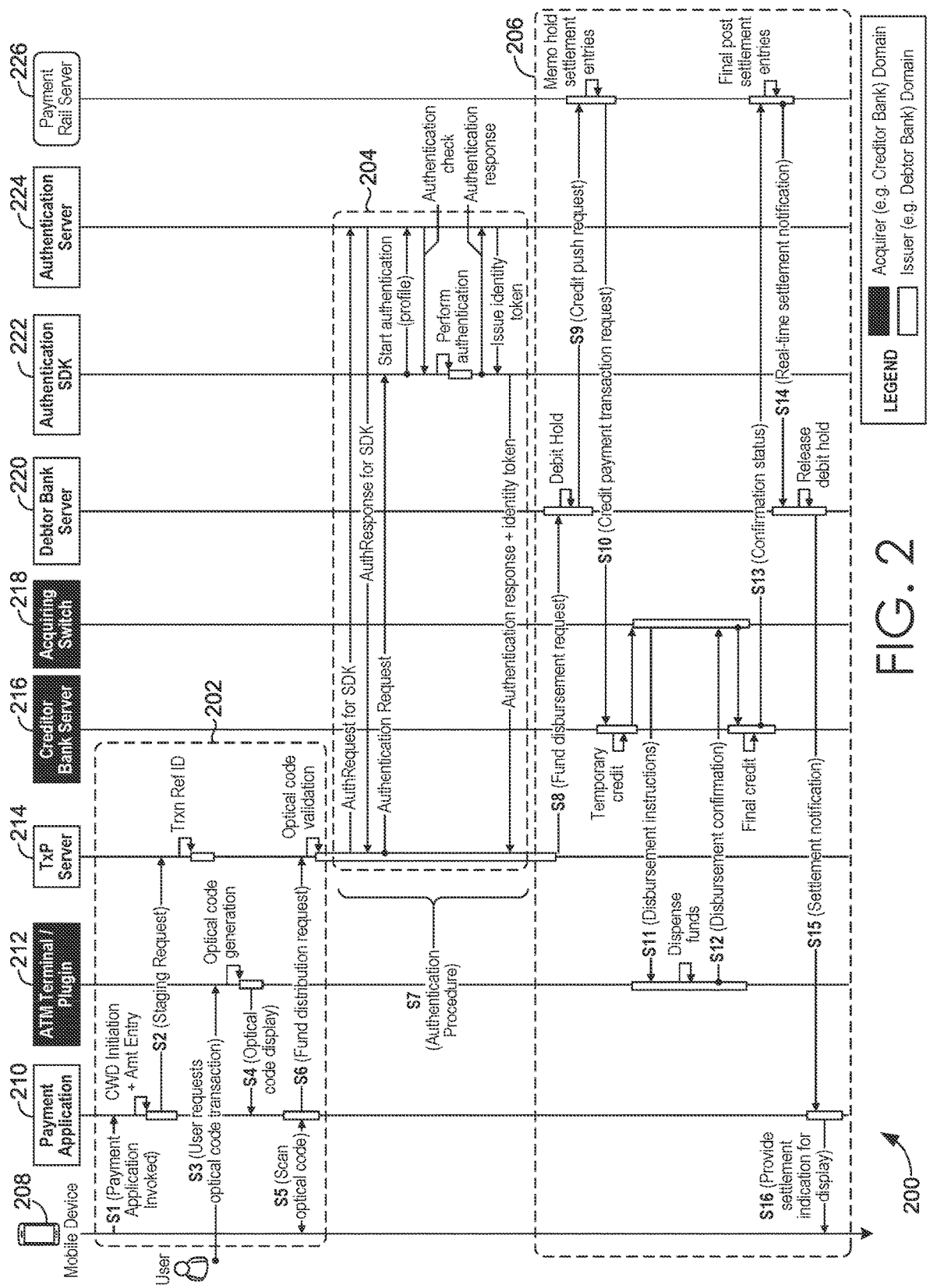
FIG. 2 is an example process flow that can be performed by components of the operating environment of FIG. 1 to disburse funds using a credit push, in accordance with an aspect described herein.

Referring now to FIG. 2, FIG. 2 is an example process flow 200 that can be performed for disbursing funds using a credit push transaction process. It should be understood that process flow 200 is but one example that can be performed using the current technology, and that other processes using a credit push and variations of process flow 200 are contemplated, but are not discussed in detail for brevity. Process flow 200 is one process flow that can be performed by components of FIG. 1 and provide many of the benefits and advantages previously discussed.

Process 200 comprises three general processes. Process flow 200 comprises an initial pre-stage and optical code communication process 202, a debtor bank domain authentication procedure 204, and a credit push fund distribution process 206. It is noted that these procedures are examples, and that other arrangements a possible. While process flow 200 comprises three distinct processes, it is contemplated that some aspects of the technology will include only credit push fund distribution process 206, while other specific aspects will comprise credit push fund distribution process 206 in addition to initial pre-stage and optical code communication process 202. Debtor bank domain authentication procedure 204 may be optionally performed with either of these aspects. As an example, an authentication procedure suitable for use, if present in an embodiment, can be based on IEEE (Institute of Electrical and Electronics Engineers) P1940, and IEEE 2410. Further, some aspects also include authentication procedures performed by mobile device 208. All of these aspects, including various other arrangements will be apparent to those of ordinary skill in the art in view of this disclosure, and such aspects are contemplated within the scope of this disclosure. While process flow 200 is described as a series of steps, it should be recognized that these steps are illustrative and not intended to limit the technology to the specific aspect illustrated in FIG. 2.

Having this in mind, process flow 200 begins at Step (S)1 with payment application 210 being invoked at mobile device 208. Example payment applications previously described are examples suitable for use as payment application 210. Likewise, mobile device 104 of FIG. 1 is an example suitable for use as mobile device 208. Prior to the application being invoked, mobile device 208 may perform one or more authentication procedures, such as biometric identification, passcode verification, and so forth.

Upon invoking payment application 210, payment application may prompt mobile device 208 to request an amount of funds to be disbursed from a debtor account linked to, or otherwise identified by, payment application 210. Mobile device 208 may receive inputs indicating the amount. The amount can be temporarily stored at a datastore accessible to mobile device 208 as part of pre-staging the transaction, which in this case, is described as a disbursement of funds from the debtor account. As an example, the pre-staged amount can be communicated at S2 to a TxP server to store the data for future use within process flow 200. In some implementations, the pre-staged information, including the amount of funds, can be locally stored at mobile device 208. In implementations, the pre-staged information can be communicated to a debtor bank to determine whether a debtor account includes the amount of funds requested. Additionally, in aspects of the technology, payment application 210 is configured to perform an authentication procedure, for instance, using hardware of mobile device 208 or receiving information and comparing it to stored information locally or at a remote datastore.

Now that the transaction has been pre-staged, at S3, a user may request the amount of funds to be distributed by ATM terminal 212. ATM 102 is an example suitable for use as ATM terminal 212. ATM terminal 212 can include a display device and input components that allow the request for fund disbursement at ATM terminal 212 to be made. In response to the request, ATM terminal 212 may generate an optical code. The optical code may embed creditor bank information that identifies a creditor bank and includes an ATM identifier that identifies and is specific to ATM terminal 212, or otherwise identifies ATM terminal 212 as the ATM terminal that generated the optical code. In implementations, ATM terminal 212 is associated with a creditor bank. For example, ATM terminal 212 can be owned, licensed, or otherwise in communication with creditor bank server 216.

After generating the optical code, ATM terminal 212 can display the optical code at a display device, at S4. At mobile device 208, payment application 210 initiates the mobile device camera, and the optical code is positioned within the line of sight of the mobile device camera. The mobile device camera captures the optical code, thereby optically communicating the code and the embedded information from the display device of ATM terminal 212 to mobile device 208 at S5. Payment application 210 decodes the captured optical code to retrieve the creditor bank information embedded within it.

At S6, mobile device 208, via payment application 210, sends a fund disbursement request to TxP server 214. TxP servers previously discussed are examples suitable for use as TxP server 214. As will be understood, the fund distribution request could be sent directly to debtor bank server 220 for further processing. In the example illustrated, the optical code is validate at TxP server 214 for additional security.

As noted, process flow 200 includes a debtor bank domain authentication procedure 204, the example steps of which are collectively shown as being performed at S7. In implementations, the debtor bank associated with debtor bank server 220 may choose to perform its own authentication procedure in addition to, or in lieu of, those performed at mobile device 208. This can include procedures to authenticate the user, and determine the user is permitted to withdraw funds from a debtor account, or procedures to authenticate the validity of communication messages across the network. In this case, the authentication procedure at S7 is being facilitated by authentication SDK (software development kit) 222 and authentication server 224. Some authentication methods suitable for use will be known to those of ordinary skill in the art. To provide an example that can be employed with the present technology, Veridium offers an SDK and a corresponding server that can be used, which generally relies on a biometric authentication process, and at the time of filing this application, is available through https://www.veridiumid.com.

Continuing with process flow 200, at S8, the fund disbursement request is sent to debtor bank server 220. Debtor bank server 108 of FIG. 1 is an example suitable for use as debtor bank server 220, while debtor bank 110 is representative of the debtor bank associated with debtor bank server 220. After receiving the fund disbursement request, debtor bank server 220 may place a debit hold for the amount of funds on a debtor account indicated in the fund disbursement request or otherwise indicated by payment application 210. As illustrated, debtor bank server 220 receives the fund disbursement request from mobile device 208 via payment application 210 and through TxP server 214.

Debtor bank server 220 then sends a credit push request to payment rail server 226 at S9. The credit push request can comprise the amount of funds being transferred, the receiving creditor bank information, including the ATM identifier, and the sending debtor bank information, indicating to the payment rail associated with payment rail sever 226 that funds should be transferred to the a creditor account associated with the ATM (e.g., the bank account of the ATM owner at the creditor bank). The payment rails previously discussed are examples suitable for use as the payment rail associated with payment rail server 226, and payment rail server 116 of FIG. 1 is an example suitable for use as payment rail server 226 of FIG. 2.

In response to the credit push request, payment rail server 226 may place a hold on the debtor bank account for the amount of funds to be disbursed. In some instances, a temporary credit may be placed on the creditor bank account (e.g., an indication of the amount of funds that will be credited to the creditor bank account upon completion of the transaction) for the amount of funds to be disbursed.

Using the creditor bank information provided in the credit push request, at S10, payment rail server 226 sends a credit payment transaction request to creditor bank server 216 associated with the creditor bank. Creditor bank server 112 of FIG. 1 is an example suitable for use as creditor bank server 216, while creditor bank 114 is representative of the creditor bank associated with creditor bank server 216.

In some instances, the creditor bank information may comprise a creditor bank identifier. Using the creditor bank identifier, payment rail sever 226 may identify a communication protocol, such as a uniform resource indicator (URI), that can be used to send messages to creditor bank server 216. The communication protocol can be used to communicate the credit payment transaction request. The credit payment transaction request can comprise the amount of funds to be transferred and the ATM identifier that identifies ATM terminal 212 and a unique instance in which the ATM terminal generates the optical code. For example, each time an optical code is generated, the ATM identifier may identify the ATM along with the unique instance, identifying both when and where the optical code was generated. This enhances security, since the ATM identify may contain unique information for each transaction.

Based on receiving the credit payment transaction request from payment rail server 226, creditor bank server 216 may identify a creditor account and temporarily credits on the creditor account for the amount of funds. The creditor account may be associated with ATM terminal 212.

Based on receiving the credit payment transaction request from payment rail server 226, creditor bank server 216 sends disbursement instructions to ATM terminal 212, at S11. Creditor bank server 216 may identify ATM terminal 212 using the ATM identifier included in the credit payment transaction request. The disbursement instructions include the amount of funds to be disbursed at ATM terminal, and correspond to the amount indicated in the credit payment transaction request and the credit push request. As illustrated, some aspects of the technology contemplate using acquiring switch 218 to route messages, including the disbursement request, from creditor bank server to ATM terminal 212 and vice versa. In implementations, the ATM identifier comprises a communication packet header that is used by acquiring switch 218 or another communication component to route the disbursement request ATM terminal 212. In some cases, the ATM identifier can be used to retrieve, via an index, a communication protocol for sending messages to ATM identifier.

ATM terminal 212, in response to receiving the disbursement instructions from creditor bank 216, which may include receiving the disbursement instructions from creditor bank server 216 through acquiring switch 218, disburses funds in an amount corresponding to the request. For instance, upon receiving the disbursement request, ATM terminal 212 can activate the dispensing device using the stored drivers to move the amount of funds from a secure chamber of ATM terminal 212 to a location accessible by the user. ATM terminal 212 verifies the amount corresponding to the request has been disbursed, and in response, at S12, sends a disbursement confirmation to creditor bank server 216 indicating that the amount of funds has been disbursed.

When creditor bank server 216 receives the disbursement confirmation, creditor bank server 216 can complete the credit to the creditor's account. At S13, creditor bank server 216 sends a confirmation status back to payment rail server 226. The confirmation status indicates that the amount of funds has been disbursed in accordance with the credit payment request received by creditor bank server 216.

Payment rail server 226 receives the confirmation status and completes settlement ledger entries between the creditor bank account and the debtor bank account on payment rail account ledger 118. Payment rail server 226 sends a real-time settlement notification indicating the settlement was completed to debtor bank server 220 at S14. In response, debtor bank server 220 completes the debit to the debtor account for the transaction amount. At S15, debtor bank server 220 sends a settlement notification that the transaction has been completed to payment application 210 for presentation by mobile device 208 at S16.

Figure 3:
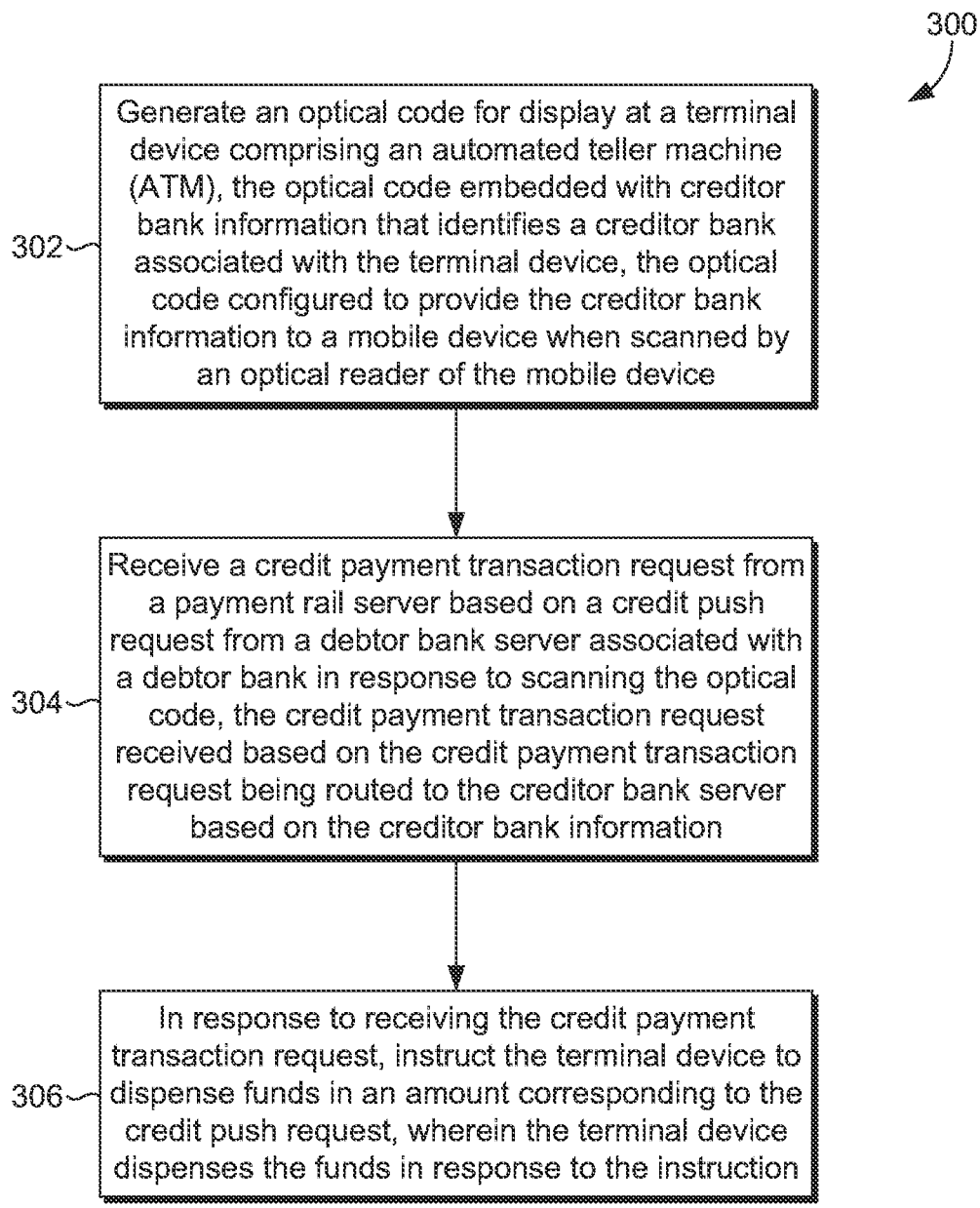
FIGS. 3-5 are block diagrams illustrating example operations that can be performed by components of the operating environment of FIG. 1 to disburse funds using a credit push, in accordance with aspects described herein.
Figure 4:
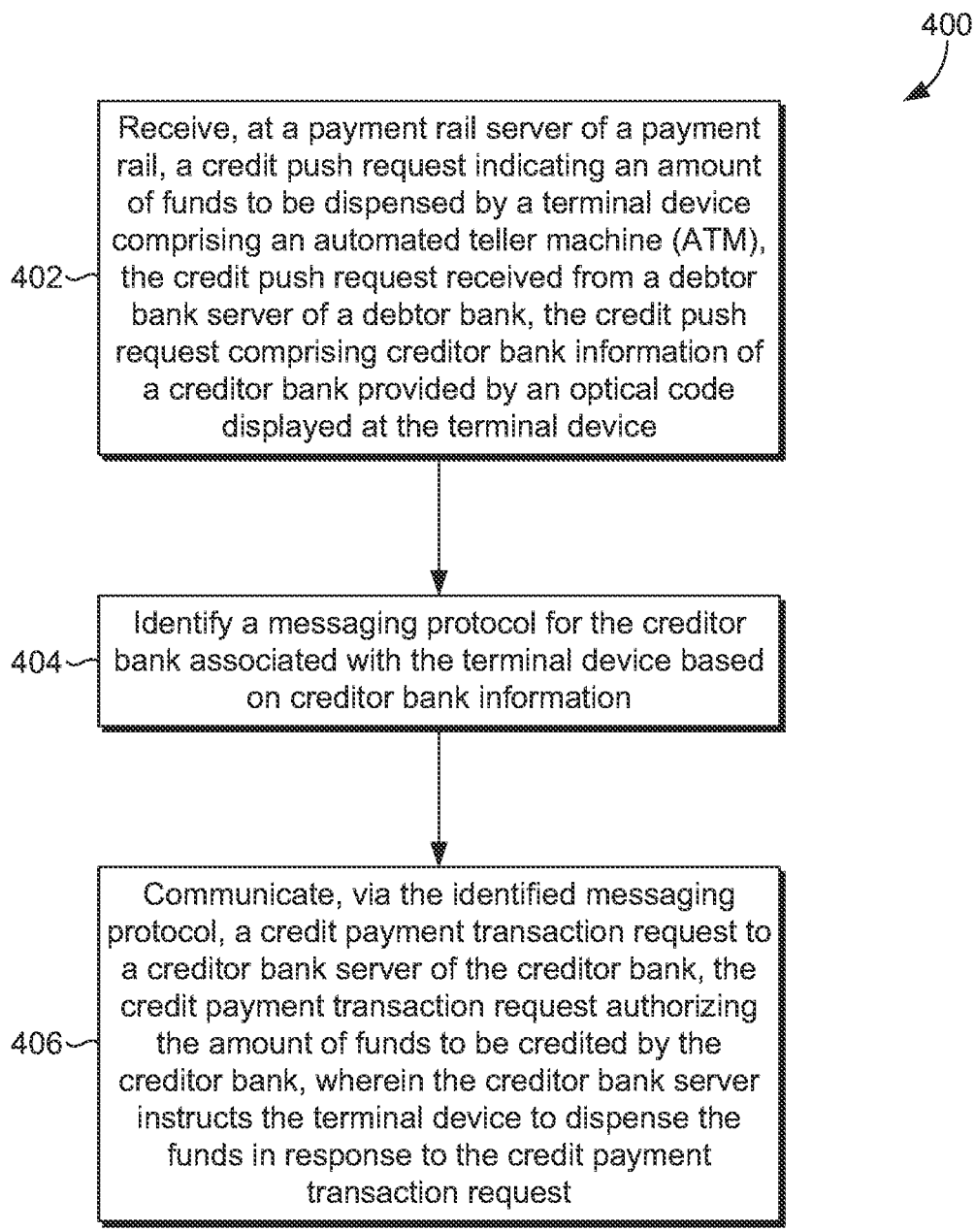
Figure 5:
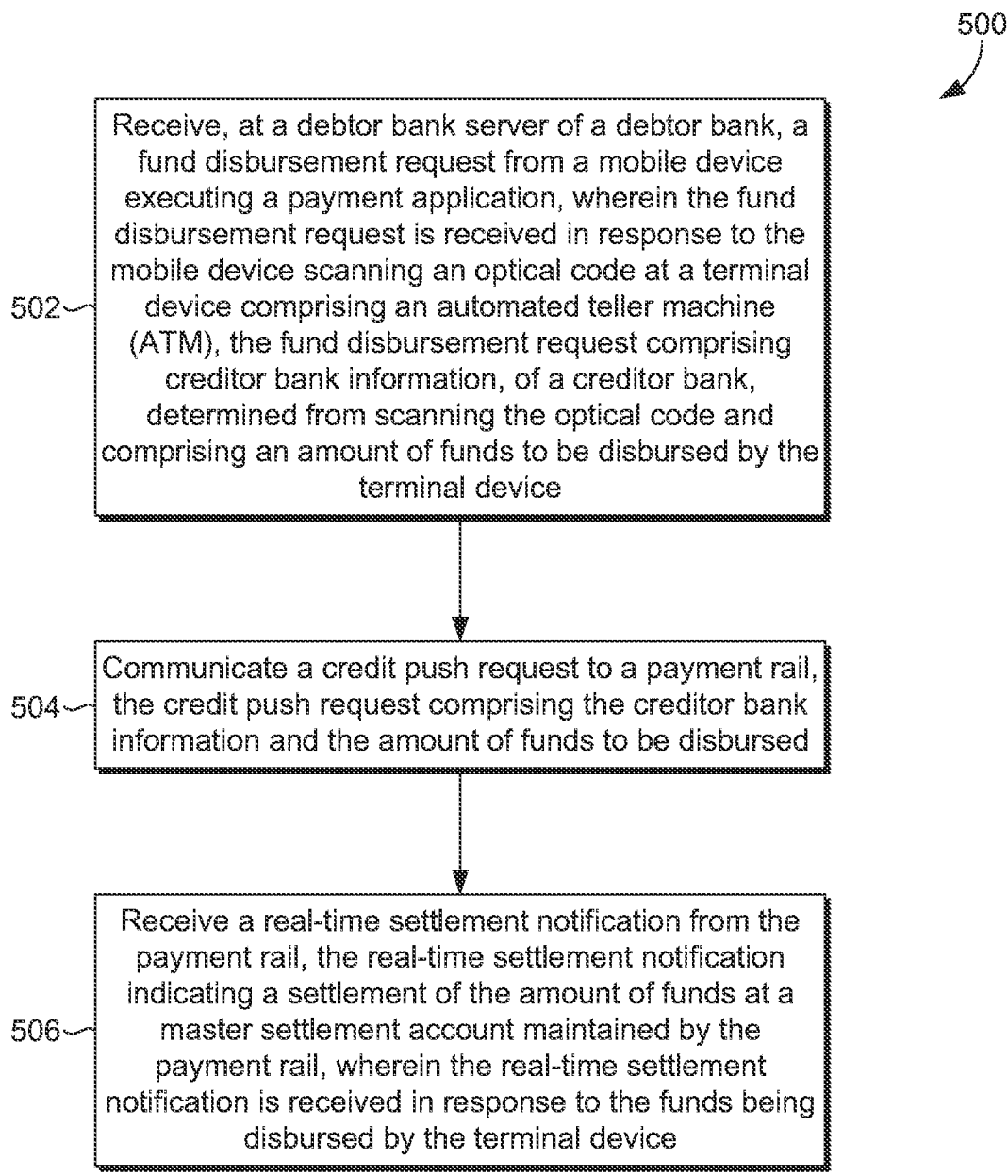

With reference to FIGS. 3, 4, and 5, block diagrams are provided to illustrate methods for funds disbursement using a credit push. The methods may be performed using components described herein, such as those described with reference to FIG. 1 and FIG. 2. In embodiments, one or more computer storage media having computer-executable instructions embodied thereon that, when executed, by at least one processor, cause the at least one processor to perform the operations of the methods.

FIG. 3 illustrates an example method 300 for distributing funds using a credit push transaction process. Some operations of method 300 are performed within a creditor domain (which in some aspects of the technology, may be called an acquirer domain). The system performing the method may include a creditor bank server; such as creditor bank server 112 of FIG. 1; an ATM, such as ATM 102 of FIG. 1; or both; among other components or functional entities.

At block 302, an optical code may be generated for display at a terminal device comprising an ATM. The optical code may be generated by the terminal device and be embedded with creditor bank information that identifies a creditor bank associated with the terminal device. The optical code can comprise an ATM identifier identifying the terminal device. The optical code is configured to provide the creditor bank information, including the ATM identifier, to a mobile device when scanned by an optical reader of the mobile device. The optical reader may comprise a camera of the mobile device that passes optical information to a payment application that decodes the optical information comprising the optical code into the creditor bank information.

In aspects of the technology, the optical code is generated by the terminal device without the terminal device initiating an authentication procedure. That is, the optical code can be generated for facilitating disbursing of funds at the terminal device without the terminal device receiving inputs associated with an authentication procedure the transaction. Further, the transaction may be completed and the funds disbursed by the terminal device without the terminal device initiating an authentication procedure. That is, the terminal device may not initiate an authentication procedure prior to disbursing funds.

At block 304, a credit payment transaction request is received from a payment rail server. The credit payment transaction request may be received from the payment rail server based on a credit push request from a debtor bank server associated with a debtor bank being received at the payment rail server. The credit push request may be received at the payment rail server from a debtor bank server in response to (e.g., subsequent to) scanning of the optical code by a mobile device at the terminal device. The credit payment transaction request may comprise an ATM identifier identifying the terminal device.

The credit payment transaction request is received based on the credit payment transaction request being routed to the creditor bank server, from the payment rail, based on the creditor bank information. In some cases, the credit payment transaction request is received based on the payment server identifying a communication protocol, such as a URI, for communicating the credit payment transaction request using the creditor bank information.

In response to receiving the credit payment transaction request, method 300 may include the creditor bank server placing a temporary credit for the amount of funds on a creditor account associated with the terminal device. The temporary credit can be placed prior to providing disbursement instructions to the terminal device to disburse funds in accordance with the amount.

At block 306, the terminal device can be instructed to disburse funds in an amount corresponding to the credit push request or the credit payment transaction request. In response to receiving the instructions, the terminal device disburses the funds in accordance with the amount. Instructions to the terminal device can be provided by the creditor bank sever through an acquiring switch. In implementations, messages, such as the fund disbursement request, can be provided from the creditor bank server to the terminal device, and vice versa, through an acquiring switch.

After disbursing the funds, a disbursement confirmation may be received from the terminal device indicating that the funds disbursed at the terminal device equal the amount corresponding to the credit push request. In some cases, the disbursement confirmation is received at the creditor bank server from the terminal device through the acquiring switch. The creditor bank server can settle the creditor account for the amount on the temporary credit in response to receiving the disbursement confirmation from the terminal device and finalize the credit by allocating funds to the account. Further, in response to receiving the disbursement confirmation, a confirmation status can be communicated to the payment rail server, where the confirmation status provides the payment rail server with message routing instructions to the debtor bank server or an indication that the funds have been disbursed in accordance with the credit payment transaction request. The payment rail server may be configured to send a real-time settlement notification to the debtor bank server upon receipt of the confirmation status.

FIG. 4 is example method 400 for distributing funds using a credit push transaction process. Some operations of method 400 are performed by a payment rail server of a payment rail, among other components or functional entities.

At block 402, a credit push request is received at a payment rail server of a payment rail. The credit push request indicates an amount of funds to be disbursed by a terminal device comprising an ATM. The credit push request may be received from a debtor bank server of a debtor bank. The credit push request can comprise creditor bank information of a creditor bank having been provided by a mobile device by an optical code displayed at the terminal device. The credit bank information may include an ATM identifier identifying the terminal device.

In response to receiving the credit push request, a debtor bank account associated with the debtor bank may be identified by the payment rail server. The debtor bank can have funds on deposit with the payment rail for settlement by the payment rail. Having identified the debtor bank account, a debit hold for the amount of funds can be placed on the debtor bank account. The payment rail maintains the creditor account in the same payment rail account ledger as the debtor bank, in some implementations. As such, a creditor bank account associated with the creditor bank can also be identified. This may be identified based on the creditor bank information received in the credit push request. Having identified the creditor bank account, a temporary credit for the amount of funds can be placed on the creditor bank account.

At block 404, a messaging protocol for the creditor bank associated with the terminal device can be identified. The messaging protocol can be identified using the creditor bank information. For instance, the creditor bank information may include the messaging protocol, for example, a commination message packet header that indicates a routing location for the message. In some cases, the creditor bank information identifies the creditor bank, and the payment rails server retrieves, from an index, the messaging protocol associated with the creditor bank server using the creditor bank information. In a specific implementation, the messaging protocol for the creditor bank server is a URI associated with the creditor bank server.

At block 406, a credit payment transaction request is communicated, via the identified messaging protocol, to a creditor bank server of the creditor bank. The credit payment transaction request authorizes (e.g., indicates) the amount of funds to be credited by the creditor bank. In response to receiving the credit payment transaction request, the creditor bank server instructs the terminal device to disburse the funds. The creditor bank server is configured to provide disbursement instructions to the terminal device upon receiving the credit payment transaction request.

In some implementations, a confirmation status is received from the creditor bank server. The confirmation status indicates a settlement of a creditor account associated with the creditor bank for the amount of funds. The confirmation status may indicate the amount of funds indicated in the credit payment transaction request was disbursed at the terminal device.

In response to receiving the confirmation status, a real-time settlement notification can be communicated to the debtor bank server. The real-time settlement notification can indicate settlement of the amount of funds between a debtor bank account and a creditor bank account at the payment rail account ledger maintained by the payment rail. Further, in response to receiving the confirmation status, the temporary credit on the creditor bank account is removed and the debit hold on the debtor bank account can be released.

FIG. 5 is another example method 500 for distributing funds using a credit push transaction process. Some operations of method 500 are performed within a debtor domain (which in some aspects of the technology, may be called an issuer domain). The systems performing the method may include a debtor bank server; such as debtor bank server 108 of FIG. 1; a payment application; or both; among other components or functional entities.

At block 502, a fund disbursement request is received at a debtor bank server of a debtor bank. The fund disbursement request can be received from a mobile device executing a payment application. In some cases, the fund disbursement request is received from the mobile device through a TxP server. The TxP server may assist in routing messages to and from the debtor bank server and the mobile device. The fund disbursement request may be received in response to the mobile device scanning an optical code at a terminal device comprising an automated teller machine (ATM). The optical code can comprise creditor bank information of a creditor bank, which is provided to the mobile device and included in the fund disbursement request. This can be determined by the mobile device when scanning the optical code and decoding the embedded information.

The fund disbursement request may be received based on an authentication procedure performed at the mobile device. The fund disbursement request may be received without an authentication procedure being performed by the terminal device. That is, the terminal device that generated the optical code does not perform an authentication procedure prior to the fund disbursement request being received.

In implementations, in response to receiving the fund disbursement request, a debit hold for the amount indicated in the fund disbursement request is placed on a debtor account associated with a payment application invoked by the mobile device, which may also be associated with the user of the mobile device, in the sense that the user is authorized to withdraw from the debtor account.

At block 504, a credit push request is communicated to a payment rail. The payment rail may be associated with and maintain a payment rail account leger that indicates deposited funds of the debtor bank or the creditor bank. The credit push request may comprise the creditor bank information and the amount of funds to be disbursed. The creditor bank information may also include an ATM identifier identifying the terminal device that generated the optical code. As noted above, a debit hold can be placed on a debtor account. In some cases, the debit hold is placed prior to the credit push request being communicated to the payment rail.

At block 506, a real-time settlement notification is received from the payment rail. The real-time settlement notification may indicate a settlement of the amount of funds between the debtor bank and the creditor bank. The real-time settlement notification may be received in response to the funds being disbursed by the terminal device.

After receiving the real-time settlement notification, the debtor bank can complete the debit to the debtor's account. A settlement notification can also be communicated to the mobile device in response to receiving the real-time settlement notification. Thus, the debtor bank server may be configured to communicate the settlement notification to the mobile device in response to receiving the real-time settlement notification.

Having described an overview of embodiments of the present technology, an example operating environment in which some of the present technology may be implemented is described below in order to provide a general context for various aspects. Referring initially to FIG. 6, in particular, an example operating environment for implementing embodiments of the present technology is shown and designated generally as computing device 600. Computing device 600 is but one example of a suitable computing environment and is not intended to suggest any limitation as to the scope of use or functionality of the technology. Neither should computing device 600 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

Figure 6:
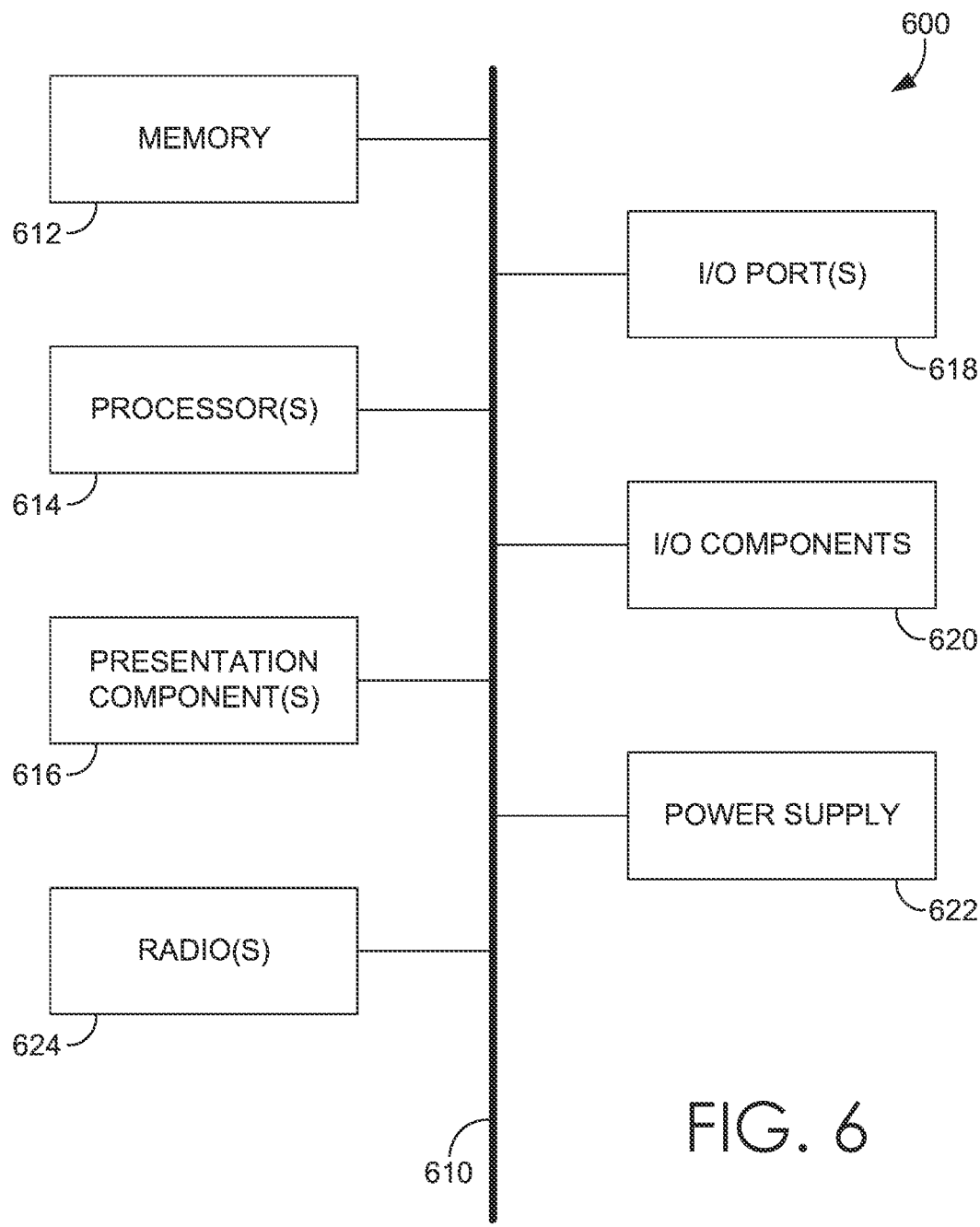
FIG. 6 is an example computing device suitable for implementing aspects of the described technology, in accordance with an embodiment described herein.

With reference to FIG. 6, computing device 600 includes bus 610 that directly or indirectly couples the following devices: memory 612, one or more processors 614, one or more presentation components 616, input/output ports 618, input/output components 620, and illustrative power supply 622. Bus 610 represents what may be one or more busses (such as an address bus, data bus, or combination thereof).

Although the various blocks of FIG. 6 are shown with lines for the sake of clarity, in reality, delineating various components is not so clear, and metaphorically, the lines would more accurately be grey and fuzzy. For example, one may consider a presentation component, such as a display device, to be an I/O component. As another example, processors may also have memory. Such is the nature of the art, and it is again reiterated that the diagram of FIG. 6 is merely illustrates an example computing device that can be used in connection with one or more embodiments of the present technology. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media.

Computer storage media include volatile and nonvolatile, removable and non-removable media implemented in any method or technology for storage of information, such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile or nonvolatile memory. The memory may be removable, non-removable, or a combination thereof. Example hardware devices include solid-state memory, hard drives, optical-disc drives, etc. Computing device 600 includes one or more processors that read data from various entities such as memory 612 or I/O components 620. Presentation component(s) 616 present data indications to a user or other device. Examples of presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, and so forth.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having," or variations thereof, has the same broad meaning as the word "comprising," and the word "accessing," or variations thereof, comprises "receiving," "referencing," or "retrieving." Further, the word "communicating," or variations thereof, has the same broad meaning as the word "receiving," or "transmitting" facilitated by software or hardware-based buses, receivers, or transmitters using communication media. Also, the word "initiating" or "invoking," or variations thereof, has the same broad meaning as the word "executing" or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

For purposes of a detailed discussion above, embodiments of the present technology described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the described schematics, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. One or more computer storage media storing computer-readable instructions that when executed by one or more processors, cause the one or more processors to perform operations for fund disbursement using a credit push, the operations comprising:
   displaying at a display device of an automated teller machine (ATM), the optical code embedded with creditor bank information that identifies a creditor bank associated with the ATM, the optical code configured to provide the creditor bank information to a mobile device when scanned by a camera of the mobile device, wherein the optical code is generated by the ATM without the ATM initiating an authentication procedure;
   receiving a credit payment transaction request from a payment rail server based on a credit push request from a debtor bank server associated with a debtor bank in response to scanning the optical code, the credit payment transaction request received based on the credit payment transaction request being routed to a creditor bank server, from the payment rail server, based on the creditor bank information;
   in response to receiving the credit payment transaction request, disbursing funds, at the ATM, in an amount corresponding to the credit push request, wherein instructions to the ATM that cause the ATM to disburse funds are routed through an acquiring switch in communication with the creditor bank server;
   receiving from the ATM a disbursement confirmation indicating the funds disbursed at the ATM equal the amount corresponding to the credit push request; and
   in response to receiving the disbursement confirmation, communicating a confirmation status to the payment rail server, the confirmation status providing the payment rail server with message routing instructions to the debtor bank server.

2. The media of claim 1, further comprising: placing a temporary credit for the amount on a creditor account associated with the ATM, the temporary credit being placed prior to the disbursement by the ATM;
   settling the creditor account for the amount on the temporary credit in response to receiving the disbursement confirmation from the ATM; and
   removing the temporary credit by allocating a corresponding amount of funds to the creditor account.

3. The media of claim 1, wherein the credit payment transaction request is received from the payment rail server based on a uniform resource identifier (URI) associated with the creditor bank server and identified by the payment rail server using the creditor bank information.

4. The media of claim 1, wherein the ATM does not perform an authentication procedure prior to disbursing the funds.

5. The media of claim 1, wherein the payment rail server is associated with a payment rail that maintains a payment rail account ledger, and the debtor bank and the creditor bank are each included on the payment rail account ledger.

6. A method performed by one or more processors for disbursing funds using a credit push, the method comprising:
   receiving, at a payment rail server of a payment rail, a credit push request indicating an amount of funds to be disbursed by an automated teller machine (ATM), the credit push request received from a debtor bank server of a debtor bank, the credit push request comprising creditor bank information of a creditor bank provided by an optical code displayed at a display device of the ATM without the ATM initiating an authentication procedure, the optical code having been captured by a camera of a mobile device to retrieve the creditor bank information and communicate the creditor bank information to the debtor bank server;
   identifying a messaging protocol for the creditor bank associated with the ATM based on the creditor bank information;
   communicating, via the identified messaging protocol, a credit payment transaction request to a creditor bank server of the creditor bank, the credit payment transaction request authorizing the amount of funds to be credited by the creditor bank, wherein the creditor bank server is configured to instruct the ATM to disburse the funds in an amount corresponding with the credit payment transaction request, wherein the payment rail identifies a uniform resource identifier (URI) for the creditor bank server, and the credit payment transaction request is communicated via the URI;

receiving a confirmation status from the creditor bank server, the confirmation status indicating a settlement of a creditor account associate with the creditor bank for the amount of funds; and in response to receiving the confirmation status, communicating a real-time settlement notification to the debtor bank server indicating the settlement of the amount of funds between a debtor bank account and a creditor bank account at a payment rail account ledger maintained by the payment rail.

7. The method of claim 6, further comprising:
in response to receiving the credit push request, identifying a debtor bank account associated with the debtor bank;
placing a debit hold for the amount of funds on the debtor bank account; and
releasing the debit hold in response to receiving a confirmation status from the creditor bank server.

8. The method of claim 6, further comprising:
in response to receiving the credit push request, identifying a creditor bank account associated with the creditor bank;
placing a temporary credit for the amount of funds on the creditor bank account; and
removing the temporary credit and allocating a corresponding amount of funds in response to receiving a confirmation status from the creditor bank server.

9. The method of claim 6, wherein the payment rail maintains a payment rail account ledger that includes the debtor bank and the creditor bank, the method further comprising settling the payment rail account ledger for the amount of funds between the debtor bank and the creditor bank after receiving a confirmation status from the creditor bank and prior to communicating a real-time settlement notification to the debtor bank.

10. A system for disbursing funds using a credit push, the system comprising:
at least one processor; and
one or more computer storage media storing computer-readable instructions thereon that, when executed by the at least one processor, cause the at least one processor to perform operations comprising:
receiving, at a debtor bank server of a debtor bank, a fund disbursement request from a mobile device comprising a camera and executing a payment application, wherein the fund disbursement request is routed through a TxP (transaction processing) server in communication with the debtor bank server, and wherein the fund disbursement request is received in response to the mobile device scanning an optical code, using the camera, at a display device of an automated teller machine (ATM), the fund disbursement request comprising creditor bank information, of a creditor bank, determined from scanning the optical code and comprising an amount of funds to be disbursed by the ATM, wherein the ATM does not perform an authentication procedure prior to receiving the fund disbursement request;

communicating a credit push request to a payment rail, the credit push request comprising the creditor bank information and the amount of funds to be disbursed; and receiving a real-time settlement notification from the payment rail based on a confirmation status to the payment rail server providing the payment rail server with message routing instructions to the debtor bank server, the real-time settlement notification indicating a settlement of the amount of funds at a payment rail account ledger maintained by the payment rail, wherein the real-time settlement notification is received in response to a disbursement confirmation indicating disbursement of the funds at the ATM in an amount to the credit push request.

11. The system of claim 10, further comprising:
placing a debit hold for the amount on a debtor account identified by the payment application executed at the mobile device, the debit hold being placed prior to the credit push request;
settling the debtor account for the amount on the debit hold in response to receiving the real-time settlement notification from the payment rail; and
releasing the debit hold.

12. The system of claim 10, wherein the fund disbursement request is received based on an authentication procedure performed by the mobile device.

13. The system of claim 10, further comprising communicating a settlement notification to the mobile device in response to receiving the real-time settlement notification.

* * * * *